Figure 1:
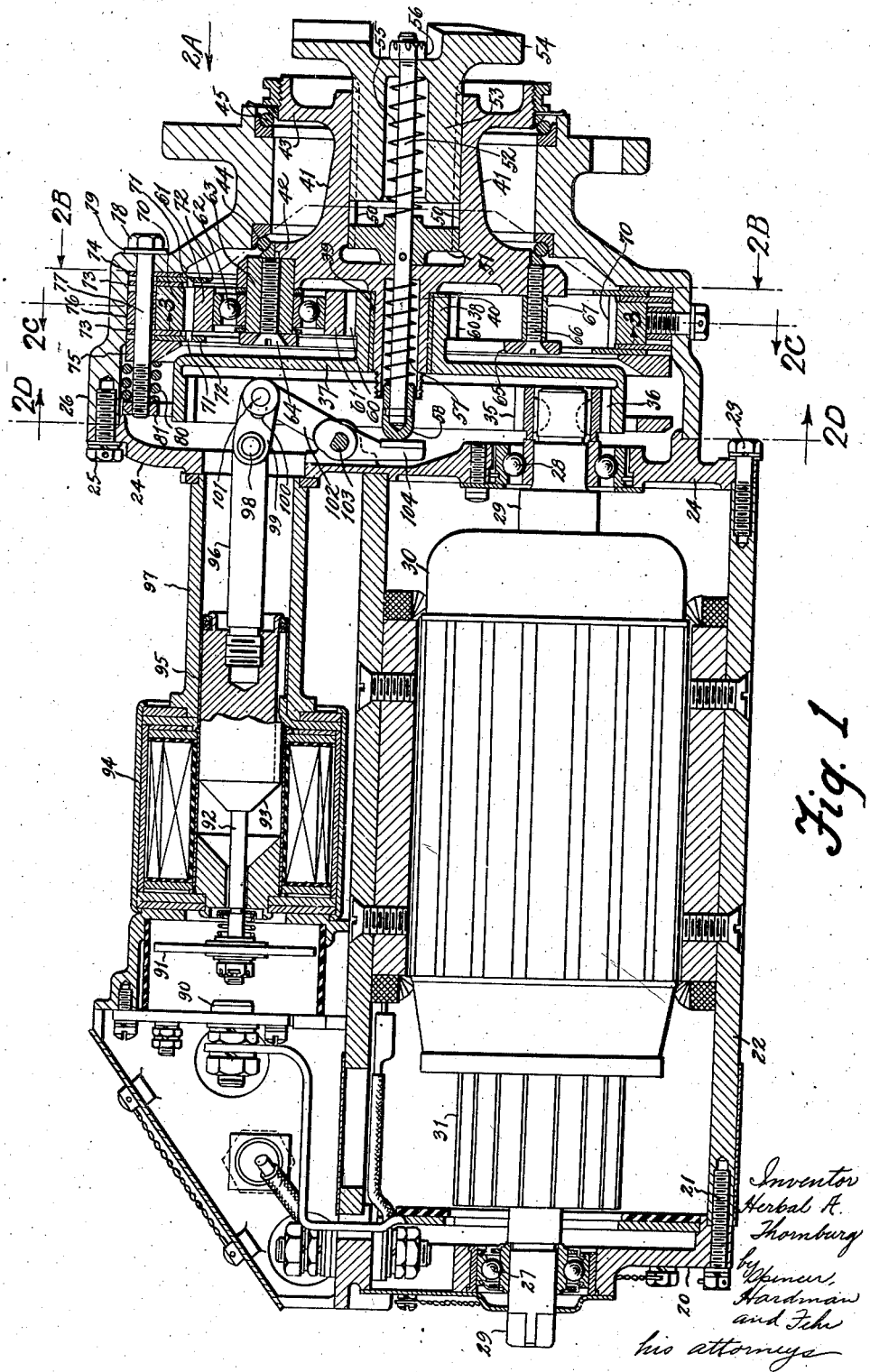

May 21, 1946.  H. A. THORNBURG  2,400,789
ENGINE STARTING APPARATUS
Filed May 26, 1943  2 Sheets-Sheet 2

Inventor
Herbal A. Thornburg
by Spencer Hardman & Fehr
his attorneys

Patented May 21, 1946

2,400,789

UNITED STATES PATENT OFFICE 2,400,789

ENGINE STARTING APPARATUS

Herbal A. Thornburg, Anderson, Ind., assignor to General Motors Corporation, Detroit, Mich., a corporation of Delaware Application May 26, 1943, Serial No. 488,595

4 Claims. (Cl. 74—291)

This invention relates to engine starters for heavy duty requiring the use of a torque limiting means to prevent straining abnormally the mechanism which connects the starting motor shaft with the engine.

It is an object of the invention to provide a torque limiting device which can be produced at relatively low cost and which can be easily adjusted from the exterior of the starting apparatus. According to the embodiment of the invention herein disclosed, this object is accomplished through the use of a planetary speed reducing drive having a ring gear which is frictionally connected with stationary parts by a restraining means comprising a plurality of plates which are urged together by coiled springs, the compression of which is adjusted by screws having their heads located on the exterior of the starter housing. By turning the screws the friction pressure can be so adjusted that the ring gear will slip when the torque exceeds a safe value. In this way the shock incidental to the connecting of the starting motor, while operating, with the engine is reduced.

Further objects and advantages of the present invention will be apparent from the following description, reference being had to the accompanying drawings wherein a preferred embodiment of the present invention is clearly shown.

In the drawings:

Fig. 1 is a longitudinal sectional view of an engine starter embodying the present invention.

Figure 2:
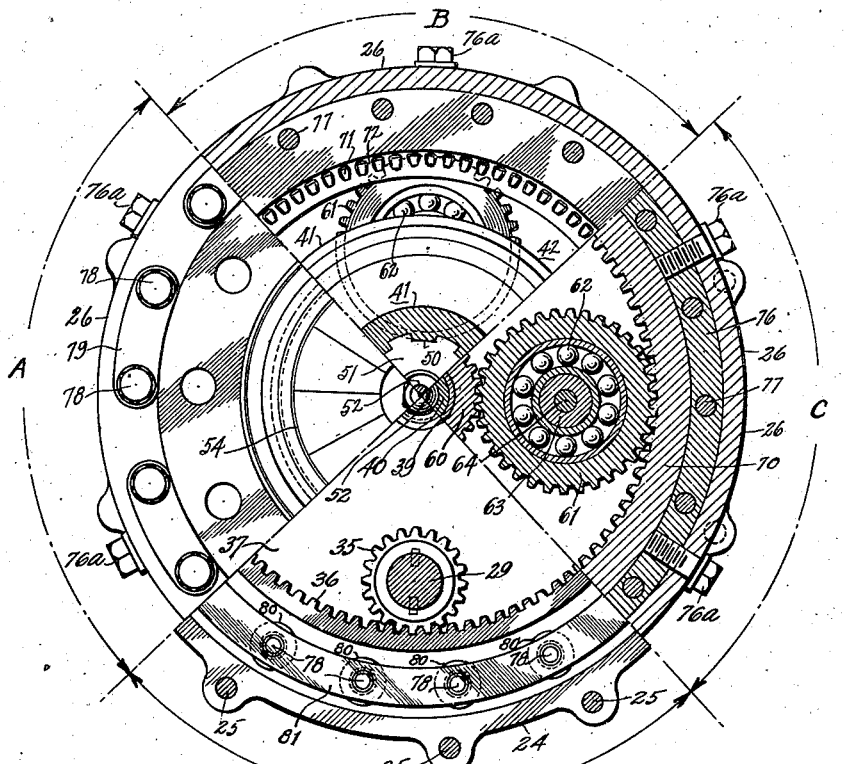

Fig. 2 is a composite view in four parts marked 2A, 2B, 2C, 2D respectively. Part 2A is a fragmentary end view taken in the direction of arrow 2A of Fig. 1. Parts 2B, 2C and 2D are fragmentary sectional views taken, respectively, on lines 2B—2B, 2C—2C, and 2D—2D of Fig. 1.

Figure 3:
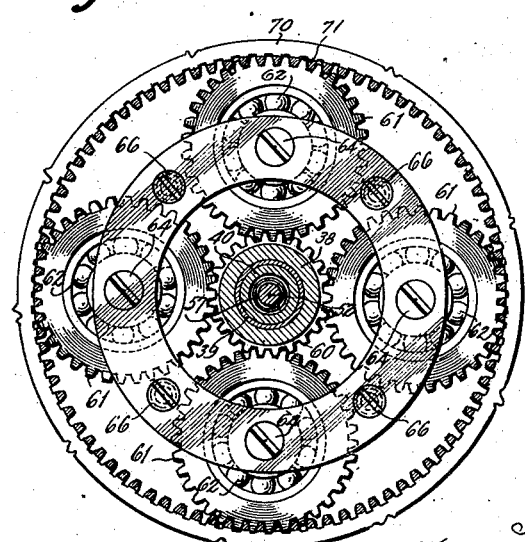

Fig. 3 is a sectional view on line 3—3 of Fig. 1.

Referring to Fig. 1, a left end frame 20 is attached by screws 21 to a field frame 22 to which screws 23 secure a right end frame 24 secured by screws 25 to a gear housing 26. Frames 20 and 24 support ball bearings 27 and 28 journalling a motor shaft 29 carrying an armature 30 and a commutator 31 engaged by brushes not shown.

The shaft 29 drives a gear 35 meshing with an internal gear 36 provided by a disc 37 having a hub 38 supporting a bearing bushing 39 journalled on the tubular extension 40 of a rotatable frame 41 having flanges 42 and 43 supporting inner races of ball bearings 44 and 45, the outer races of which are supported by gear housing 26.

Frame 41 is internally splined at 50 to provide driving connections between the frame 41 and a disc 51 fixed to a rod 52 and the hub 53 of a driving element 54 adapted by axial movement to engage with a similar driven element (not shown) connected with the engine to be started. A spring 55 urges element 54 away from disc 51 until element 54 strikes a nut 56 threaded on the end of rod 52, thus limiting separation of disc 51 and element 54. Element 54 is normally held out of engagement with the driven element on the engine by a spring 57 located between the rotatable frame 41 and thimble 58 attached to the left end of rod 52. When the rod 52 is moved right by means to be described later, the disc 51 moves right and movement to the right is transmitted by spring 55 from the disc 51 to the driving element 54.

The hub 38 of internal gear disc 37 provides a gear 60 meshing with four gears 61 (Fig. 3) which support the outer races of ball bearings 62, the inner races of which are supported by plugs 63 carried by the rotating frame 41. A ring 65 is secured to frame 41 by screws 64 extending through the plugs 63, and at points between the plugs 63, as indicated in Figs. 1 and 3, other screws 66 pass through spacers 67, positioned between the ring and frame 41, the screws 66 directly engaging the frame 41. Gears 61 mesh with an internal ring gear 70, the teeth of which have projections 71 received by holes in the plates 72. The body of gear 70 is confined between the plates 73, and these are held against rotation by the adjusting screws 77 described more fully later, which extend through holes in the plates 73. The right hand plate 72 is confined between a plate 73 and a plate 74 bearing against a plane surface of the housing 26. The left hand plate 72 is confined between a plate 73 and a pressure ring 75. Scews 77 having head 78 located outside the housing 26 pass through resilient lock washer plates 79, the housing 26, a plate 74, a plate 73, a spacer ring 76, a plate 73, the pressure ring 75 and springs 80 and screw-theadedly engage a ring 81 which serves as a nut for all the screws 77. The pressures exerted by the springs 80 to create friction between the several plates are adjusted by turning the screws 77 in order to limit to a safe value the torque transmitted by the starting motor to the coupling element 54.

The ring gear 70 is received within a stationary ring or annulus 76 through holes in which the adjusting screws 77 extend, as shown in Fig. 2, and screws 76a hold the annulus 76 against any rotation so that the annulus will be properly positioned with respect to screws 77 and the latter can be adjusted without binding.

It will be noted that the adjusting screws 77 support the pressure springs 80, are adjustable to vary the pressure of such springs on the restraining means and also support and hold against rotation the fixed plates of the restraining means.

In operation, when the motor is energized, the torque of the motor is transmitted through the previously described gearing and restraining mechanism to the driving element 54. The gear 70 is normally stationary and the planetary pinions 61 cooperate therewith in the usual manner to drive the element 41 and element 54 splined thereto. In the event, however, of any increased reaction on the ring gear 70, the restraining means will yield and allow a movement of the ring gear to protect the parts of the starter assembly against injury.

The motor is controlled by a switch having two stationary contacts 90 and a bridging contact 91 insulatingly supported by a rod 92 attached to a solenoid armature 93 of a solenoid electro-magnet 94. Armature 93 slides within a tube 95 extending into a tube 97 enclosing a rod 96 attached to armature 93. Rod 96 is connected by a pin 98 with a link 99 having a slot 100 which receives a pin 101 connected with an arm 102 attached to a shaft 103 carrying an arm 104 for engaging the thimble 58.

When the solenoid 94 is energized by closing a control switch, not shown, the armature 93 moves left to move the switch contact 91 into engagement with contacts 90 and the rod 52 and the spring 55 move toward the right to force the coupling driving element 54 into engagement with its companion driven element, not shown. If complete engagement of the coupling elements does not occur before the motor starts the armature 93 continues to move left to close the motor switch. The motor starts and the coupling element 54 is rotated into full registration with its companion element. Before the complete engagement of the coupling elements takes place, the motor may attain considerable speed. The shock on the gearing incidental to starting the engine into motion is materially reduced by allowing the ring gear 70 to slip thus limiting the torque which can be transmitted to a value which will not abnormally strain the starting mechanism. As the speed of rotation of the engine crank shaft increases the torque decreases; and, the slippage of the ring gear 70 diminishes to zero before the engine becomes self-operative.

While the embodiment of the present invention as herein disclosed, constitutes a preferred form, it is to be understood that other forms might be adopted, all coming within the scope of the claims which follow.

What is claimed is as follows:

1. In engine starting apparatus having an electric motor provided with a frame, a gear housing attached thereto and a driving element operable by the motor and adapted to engage a driven element; means for connecting the motor with the driving element including planetary gearing within the housing and a relatively fixed ring gear, a friction plate restraining means for yieldably connecting the ring gear with the housing and including, as rotatable plates, the ring gear and two other plates connected with the ring gear and spaced therefrom and including, as fixed plates, plates which engage the ring gear and the rotatable plates connected with the ring gear, springs for applying pressure to the plates, and means including screws having heads located exterior to the housing for varying the pressure applied by the springs in order to variably limit the torque.

2. In engine starting apparatus having an electric motor provided with a frame, a gear housing attached thereto and a driving element operable by the motor and adapted to engage a driven element; means for connecting the motor with the driving element including planetary gearing within the housing and a relatively fixed ring gear, a friction plate restraining means for yieldably connecting the ring gear with the housing and including, as rotatable plates, the ring gear and two other plates spaced from the ring gear and connected with the ring gear through its gear teeth and including as fixed plates, plates which engage the ring gear and the rotatable plates connected with the ring gear, springs for applying pressure to the plates, and means including screws having heads located exterior to the housing for varying the pressure applied by the springs in order to variably limit the torque.

3. In engine starting apparatus having an electric motor provided with a frame, a gear housing attached thereto and a driving element operable by the motor and adapted to engage a driven element; means for connecting the motor with the driving element including planetary gearing within the housing and a relatively fixed ring gear, a friction plate restraining means for yieldably connecting the ring gear with the housing and including, as rotatable plates, the ring gear and two other plates connected with the ring gear and spaced therefrom and including, as fixed plates, plates which engage the ring gear and the rotatable plates connected with the ring gear, screws having heads located outside the housing and having their shanks passing through the housing and fixed plates and having screw-threaded ends, a ring having tapped holes for receiving the screw-threaded ends of the screws, and coiled springs surrounding the screws and located between said ring and the nearest adjacent fixed plate of the restraining means.

4. In an engine starting apparatus having an electric motor provided with a frame, a gear housing attached thereto and a driving element operable by the motor and engaging a driven element; means for connecting the motor with the driving element including planetary gearing within the housing and a relatively fixed ring gear, a friction plate restraining means for yieldably connecting the ring gear with the housing and including fixed and rotatable plates, springs for applying pressure to the plates and means for supporting said springs which is adjustable to vary the pressure exerted by said springs on the plates, said means also serving to prevent any rotational movement of the fixed plates of said restraining means.

HERBAL A. THORNBURG.